United States Patent [19]

Prewitt, Jr. et al.

[11] 4,093,954
[45] June 6, 1978

[54] MOTION RECORDER INDICATOR

[76] Inventors: Richard H. Prewitt, Jr., 439 N. Broadway, Lexington, Ky. 40508; Richard H. Prewitt, R.R. #3, Lexington, Ky. 40505

[21] Appl. No.: 622,221

[22] Filed: Oct. 14, 1975

[51] Int. Cl.² .............................................. G01D 9/00; G01D 15/16; G01B 5/00; F16F 11/18
[52] U.S. Cl. ................................ 346/7; 346/124; 308/2 A; 33/147 D; 33/148 D; 267/163
[58] Field of Search ................ 346/7, 124, 77 R; 308/2 A; 33/147 D, 148 D; 267/154, 163

[56] References Cited

U.S. PATENT DOCUMENTS

| | | | |
|---|---|---|---|
| 2,932,967 | 4/1960 | Prewitt et al. | 73/88 R |
| 3,089,342 | 5/1963 | Willis | 267/163 X |
| 3,331,078 | 7/1967 | Howland | 346/7 |
| 3,430,250 | 2/1969 | Prewitt et al. | 346/7 |
| 3,581,298 | 4/1969 | Billawala | 267/163 X |
| 3,611,798 | 10/1971 | Scott | 346/7 UX |
| 3,725,948 | 4/1973 | Prewitt et al. | 346/124 X |
| 3,754,276 | 8/1973 | Endres | 346/7 |

*Primary Examiner*—George H. Miller, Jr.

[57] ABSTRACT

A recorder-indicator which mechanically magnifies strain or movement using special flex pivots. The lever system is activated by the motions being recorded or observed. A pointer indicates the strain or movement. It also marks or scribes a record of maximum movement on a recording medium having a scale. The recording media may be placed in a slide for projecting the recorded data and scale on a screen for enlargement.

The recording media may be moved in the "Y" direction by one of several means to separate events recorded in the "X" direction.

One of the features of the invention is the type of flex pivots that are suitable for small angular motion with minimum distorsion under high load. These pivots may be placed close to each other without interference. Other species of flex pivots are inexpensive to manufacture and still other flex pivots are suitable for relatively large loads and angular movements.

The amplified motion is also used to activate limit switches.

16 Claims, 33 Drawing Figures

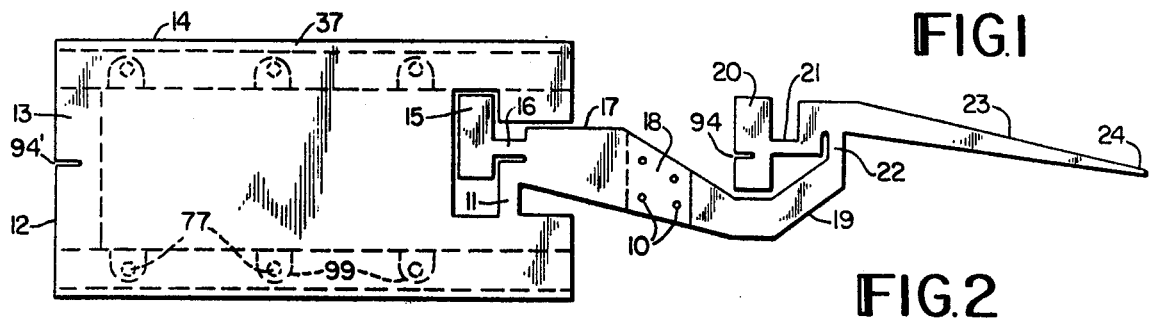
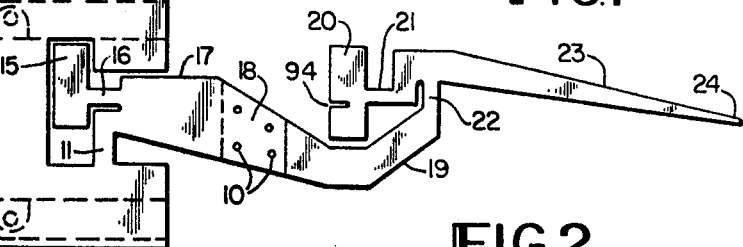
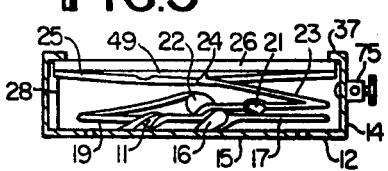
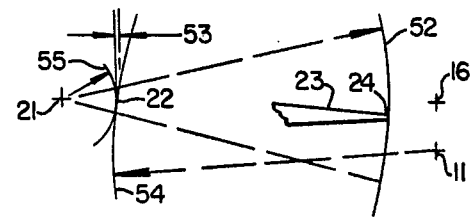
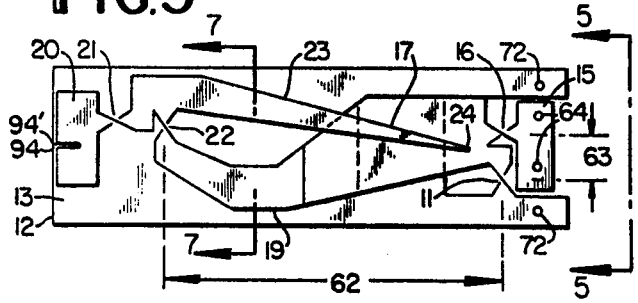
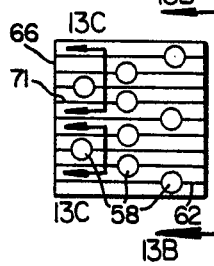
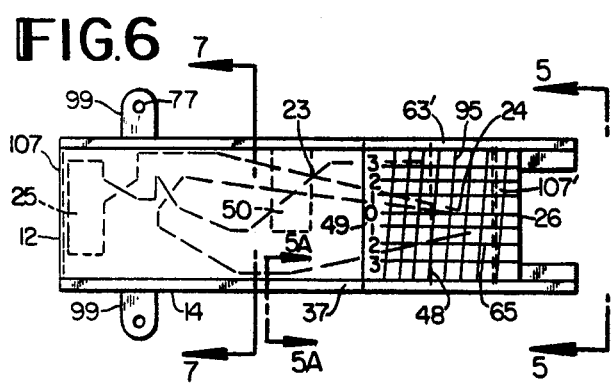
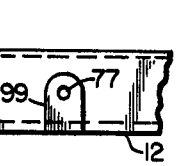
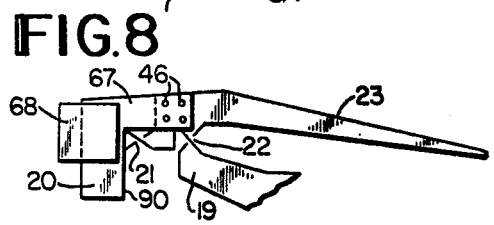
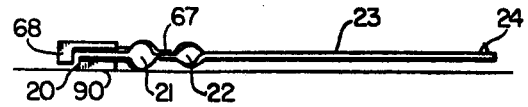

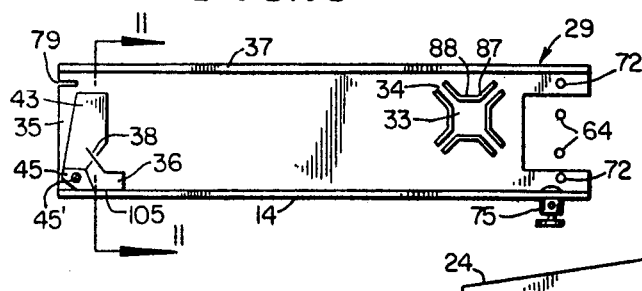
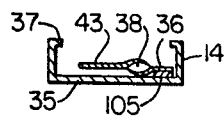
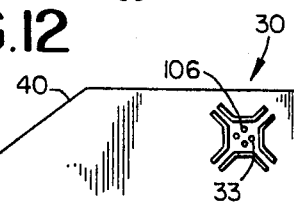
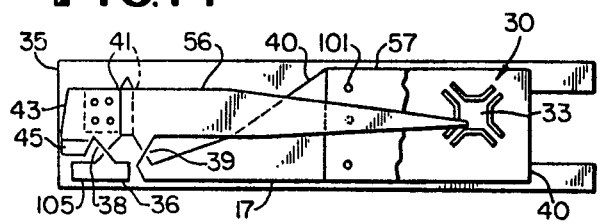
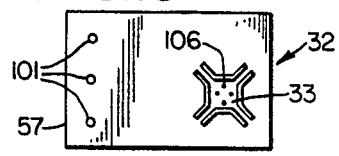
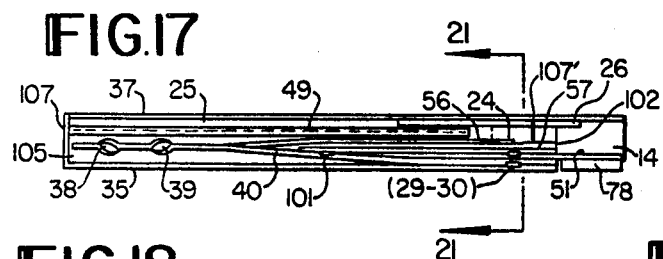
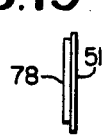
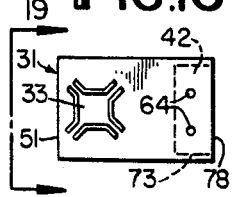
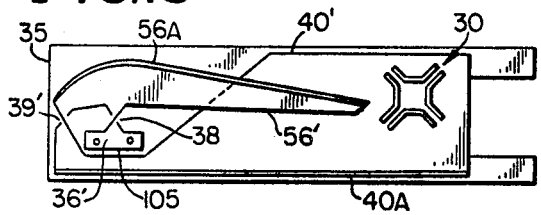
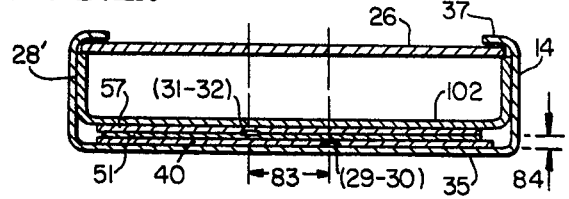
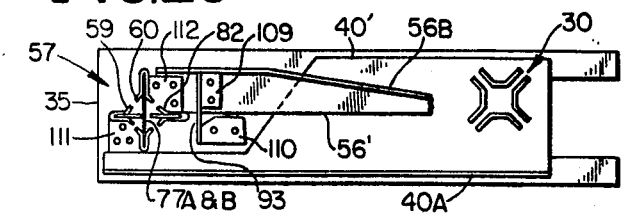
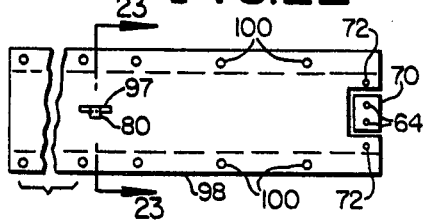
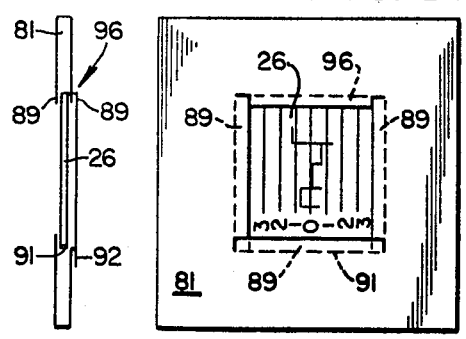
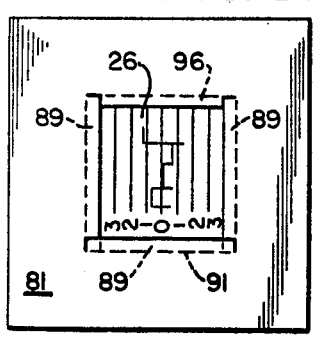
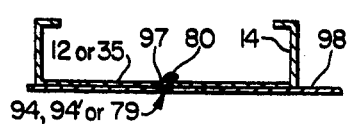
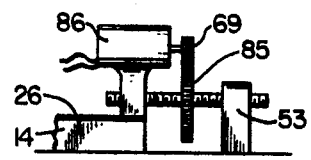
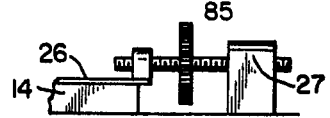

MOTION RECORDER INDICATOR

REFERENCES

U.S. Pat. Nos. 2,932,967, 3,430,250, and 3,725,948 disclose scratch strain gages which scribe a trace on a target. The strain being recorded caused the target to advance at each event. It was necessary to place the target under a microscope to determine the values of the recorded events. The present invention differs from the above inventions in that the instrument magnifies the motion of an indicator arm for visual observation. This magnifies the data without the necessity of using a microscope. In addition, the target of the present application can be shifted to a new location manually or by other means to provide a plurality of areas on the target for recording deflections.

It should be understood that our application for a Motion Tape Recorder, Ser. No. 622,229, and our application for a Recording Instrument, Ser. No. 622,229, both filed concurrently with this application cover similar inventions. Any ideas disclosed in either of the co-pending applications and applicable to this application are considered to be a part hereof.

SUMMARY OF THE INVENTION

The purpose of this invention is to provide a recorder-indicator that will visually indicate and concurrently make a record of strains or small motions.

The recorder-indicator may be attached to a structural member at two separated locations to indicate and record strain in a workpiece or it may be attached to one member at one end and to another member at another location to record and indicate changes in distance between the two members.

There is a wide range of selection for the ratio between the movement of an indicator marker pointer and the actual strain or movement. The indicator point rubs or scribes a trace on the underside of a coated glass or opaque recording media (or target) to record the maximum strain or movement. One target species substitutes electrical connectors which activate signals through its limit switches. The target is arranged to be adjusted in a multitude of different longitudinal locations relative to the indicator point. This is accomplished either manually or by forces derived from environmental changes or other means as by electric motor for small position changes at specific intervals of time. Targets may be exchanged when desired. Another feature of this invention is the balanced lever-pivot arrangement. This eliminates movement of the marking indicator arm when the recorder-indicator is in an accelerating environment.

The movements being recorded are very small. For example, a 3,000 pounds per square inch load on a piece of steel compresses or elongates the steel by a distance of 0.0001 inches per inch of length. With a 10 inch gage length between the two attachments to the workpiece, the total movement that the recorder-indicator must amplify is 10 inches $\times$ 0.0001 inch = 0.001 inch. It can readily be understood that all play must be eliminated and the mechanical ratio must be substantially constant to make the unit reliable and to reduce hysteresis. Play is eliminated by the use of special flex pivots. Inplane stiffness is provided to promote a constant ratio between the actual movement and the movement of the marking point.

One species of the invention uses simple twist pivots. A second species uses more sophisticated first stage pivots. They are called wheel pivots because they depend upon the deflection of spokes for angular motion. Alternate arrangements of the second stage pivots are shown in other configurations. First stage refers to the first pair of pivots or lever used for amplifying the movement and second stage refers to he second pair of pivots or lever which further amplify the first stage amplified motion. Parts of the recorders which are common to all species are illustrated and described as related to the first species. They include the cover, the recording media or target with its position changes, temperature compensation, limit switches, dynamic balancing the lever and indicator system, and slide projection system.

The movement of the marker point on the target can be evaluated by comparing the trace with the scale on the target. Also, the target may be placed in a special slide holder and projected on a screen to enlarge the trace and scale. The scale lines on the target may be substituted with electrical conducting material which will close a circuit when the point contacts any scale lines. Additional color markings may be added to the target to relate its various areas to strain or movement.

DESCRIPTIONS OF DRAWINGS

FIG. 1 is a flat pattern view of the first form of the invention.

FIG. 2 shows a view of FIG. 1 after rotating the two arms by 180°. The sides of the base plates are not shown.

FIG. 3 is the same as FIG. 2 except the marking indicator arm has been rotated about the twist pivot and the attachment plate has been rotated about its twist pivot.

FIG. 4 shows the movements about pivots.

FIG. 5 is an end view at 5—5 combining FIGS. 3 and 6.

FIG. 5A is an enlarged partial section view of FIG. 6.

FIG. 6 is a plan view of recorder.

FIG. 7 is a section view 7—7 of FIGS. 3 and 6 combined.

FIG. 7A shows a bend down tab for positioning the gage.

FIG. 8 shows the plan view of a balance weight for eliminating deflections due to accelerations.

FIG. 9 is an elevation view of the balance weight assembly shown in FIG. 8.

FIG. 10 shows a plan view of the formed base plate for another species of the invention.

FIG. 11 is a section view 11—11 of FIG. 10.

FIG. 12 is a flat pattern view of a lever arm and indicator arm.

FIG. 13A is a plan view of a second species target.

FIG. 13B is an end view of a second species target.

FIG. 13C is enlarged section views of target, contact point and contact strips.

FIG. 14 is a plan view with lever plates attached and one arm folded.

FIG. 15 is a plan view of auxiliary lever plate.

FIG. 16 is a plan view of anchor pivot plate.

FIG. 17 is an elevations view of the invention with near side removed.

FIG. 18 is a plan view of another species of the secondary lever system.

FIG. 19 shows an elevation view of FIG. 16.

FIG. 20 shows another species of secondary pivots.

FIG. 21 is a section view 21—21 of the wheel pivots shown in FIG. 17.

FIG. 22 is a plan view of temperature compensation base plates.

FIG. 23 is a combined section view of FIGS. 10 and 22.

FIG. 24 illustrates a method of advancing the recording media.

FIG. 25 illustrates power input for advancing the recording media.

FIG. 26 shows a special slide frame for mounting the recording media.

FIG. 27 is a side view of FIG. 26.

FIG. 28 is a section view of a twist pivot before twisting.

FIG. 29 shows a straddle mount for a wheel pivot.

FIG. 1 shows a flat pattern plan view of the large base plate 12 having sides 14 and lips 37 to be bent 90° along the dotted lines. The finished shape is illustrated in the view shown in FIG. 5. A flat assembly of the arms and case may be formed from one, or two pieces of material as indicated by lap joint 18.

Members 11 and 16 are elongated connecting members between base plate 12, lever arm 17 and mounting area 15. Arm 17 is attached to arm 19 in the lapped area 18. Spot weld 10 may be used to join arms 17 to 19 if the materials are compatible, otherwise, they will be joined by other suitable means such as adhesives or deformations. Members 21 and 22 are elongated connections between arm 19, mounting area 20, and marking indicator arm 23. The large base plate 12 has mounting area 13 on its underside for attachment to the workpiece 8 and on its upper side to accommodate attachment of mounting area 20. When elongated members 11,16,21, and 22 are rotated 180° they become twist pivots permitting angular movement between adjacent members. The upper side of marking indicator arm 23 carries a marker or scribe point 24. The slots 94 and 94' involve temperature compensation which will be explained later. Slides 14 and 37 shown in FIGS. 1 and 10 are omitted in FIGS. 2,3,12,14,18, and 20.

FIG. 2 shows lever 17–19 and marking indicator arm 23 rotated to the left about twist pivot 11.

It also shows mounting area 15 rotated 180° at twist pivot 16. Before lever 17–19 is rotated a full 180° about twist pivot 11, mounting area 15 is rotated 180° about twist pivot 16. Also, marker indicator arm 23 and mounting area 20 are initially rotated about their respective twist pivots 22 and 21 before arm 17–19 has completed its 180° of movement. The resulting configuration is illustrated in FIG. 3.

The mounting area 20 for marking indicator arm 23 fastens on top of the base plate 12 as indicated in area 13. Slot 94 of mounting area 20 mates slot 94' in base plate 12. Function of slots 94 and 94' are explained later.

FIG. 4 shows a layout of the movements of the pivot arms. The movement of the point 24 about twist pivot 21 is shown by arc 52. The movement of twist pivot 22 about twist pivot 11 is shown by arc 54, and the arc of twist pivot 22 about twist pivot 21 is at arc 55. The difference between the distance between twist pivots 11 and 21 having a value equal to the sum of arcs 55 and 54 and the addition of arcs 54 and 55 as they meet (for the limit movements of marking indicator arm 23) is shown at dimension 53. This small difference must be accommodated primarily by shear deflection of twist pivots 11 and 22. Because twist pivots 16 and 21 are in substantial alignment with the load line through these pivots they will accommodate a much smaller proportion of the total deflection. When the pivots deflect to accommodate the movement at dimension 53 forces are created which either tend to center the marker point 24 or cause it to move away from the center. For this application these forces will be used to control the neutral position of point 24.

There are two reasons for making arm 19 and marking indicator arm 23 out of one piece of material and arm 17 and base plate 12 out of another piece of material. They are: (a) the manufacture is simplified by permitting modifications in the offset between twist pivots 11 and 16 or twist pivots 21 and 22 independently. (b) more important is the selection of materials of different thickness or having different characteristics better suited to the first stage or the second stage pivots.

The load on the first stage twist pivots 11 and 16 is much greater than the load on second stage twist pivots 21 and 22. On the other hand, the angular motion required for the first stage twist pivots 11 and 16 is proportionaly less than that required for second stage twist pivots 21 and 22. The only source of external resistance force occurs from the friction between the point 24 and the underside of the target 26, illustrated in FIGS. 5 and 6. The force in twist pivot 22 is the ratio of the distance between the point 24 and twist pivot 21 divided by the distance between twist pivots 21 and 22 multiplied by the friction force at point 24. Likewise, the force at twist pivot 16 is the ratio of the distances between twist pivots 11 and 22, dimension 114, FIG. 3, divided by that between twist pivots 11 and 16, dimension 63, multiplied by the force at twist pivot 22. Since each of these lever arm ratios may be of the order of 20 to 1, it can readily be seen that design of individual pivots is important.

The thickness of base plate 12 and copending arm 17 may be considerably greater than that of marking indicator arm 23 and its copending arm 19. Lever systems used in other disclosures of this application are different, but the basic method of evaluating movements and forces is substantially as disclosed above. Because of the greater angular movement of secondary pivots, it will be necessary to make them of very thin material so that they will not be strained beyond the yield or fail from fatigue.

In order to attain a thin member at the hinging portion of the twist pivot yet have adequate stiffness elsewhere, the twist pivots 21 and 22 may be swaged locally at 113, illustrated in FIG. 28. An alternate method (not illustrated) is to make parts 19 through 22 out of sandwich material in which the faces meet at the center of pivot 21 and 22. At one end of the pivot the shim stock will be formed into a light sandwich for the marking indicator arm 23 and the other end it will be attached to the outer faces of arm 19.

The lever system illustrated in FIG. 3 is combined with the parts shown in FIG. 6 for the end view shown in FIG. 5. Cover plate 25 extends from the end of the recorder to dashed line 48, FIG. 6. It lies below target 26. Furthermore, it is offset or bowed down away from the underside of target 26 to prevent rubbing or marking the under surface of target 26 when 26 is moved. Cover plate 25 is held in place by upper and lower detents 9 and 9' illustrated in FIG. 5A. The left side of FIG. 5 shows an alternate arrangement for supporting cover 25 and target 26. Side rails 28 are attached to the sides 14 of base plate 12. Cover plate 25 fits between detents 9 and 9' or between side rails 28 and 28' illustrated in FIG. 7.

Target 26 may have a knob (not shown) for moving it longitudinally in its track. When it is intended to place target 26 in a slide frame the knob is eliminated. In this case, target 26 is moved by pushing either of its ends. A piece of dust excluding material 49, FIG. 5, is fastened to the under surface of target 26 near its inboard end to close the space between cover 25 and target 26. Rails 28 are stepped up at the end of cover plate 25 at 48. The step in side rail 28 is equivalent to the thickness of cover plate 25. Target 26 fits snug in its track in the sides 14 of base plate 12 and between the top lip 37 and sides 14 and side rails 28 and upper surface of cover 25. It will remain as positioned after moving due to friction. For the controlled activated species of target 26 it will be free to slide without play.

Point 24 creates a laterally disposed mark on the target 26 for recording strain or movements. In addition, each time the position of the target 26 is shifted longitudinally in its track, a mark parallel to the target track is formed on the target. This latter mark may be used for calibration purposes. See FIG. 26 for example.

The target 26 may be moved directly by hand or through turnbuckle 85. Changes in the elements such as, temperature, pressure, humidity, wind, water, etc., will cause longitudinal shifting of target 26. The source of such movement is generated in or through device 27 of FIG. 24. The turnbuckle reduces the movement and makes it suitable for either hand operation, environment activation, or with suitable gears and motor for electrical activation. FIG. 25 shows the mechanical-electrical arragnement. Activator 86 is geared to turnbuckle 85 through sprocket 69. Activator 86 may operate continuously, at specific intervals, or on demand from a remote station, such demand may originate from an environmental source. In any case, all of the systems described above are to move the target in its slide so that a new area of the target is exposed to the marking point 24 for recording strains or movements.

Target 26 is preferably made of a transparent plastic or glass material coated on its under surface with a dark material which is removed when point 24 moves across its surface. The dark material is eliminated or removed for scale lines 65, and for the numerals.

The position of marking indicator arm 23 may be seen opposite the transparent lines, the numerals and at the point. The transparent coated target 26 may be placed in the special slide holder illustrated in FIGS. 26 and 27 for projection on to a screen. The contrast betwen marking indicator arm 23 and its background will be enhanced by making the arm of reflective material such as stainless steel and the background flat black. Also, the face or marking indicator arm 23 may be coated with phosphorescence material to cause it to indicate in the dark. The target 26 may also be made of metal, such as brass. In this case, the point 24 will scribe a record on a polished surface having reference scale lines 65. The cover 25 may incorporate a suitable transparent window shown at 50, FIG. 6, for observing the position of the marking indicator arm 23. Also, the upper surface of the metal target 26' (not illustrated) will be marked with divisions associated with a fixed location on the upper lip 37 of side 14 of base plate 12 shown at locator mark 63' to assist in locating the longitudinal positions of target 26'. These divisions will have substantially the same spacing as division lines 95 of FIG. 6.

The primary consideration is to have a combination of scribe or rubbing point 24 and associated surface of target 26 or 26' which produce the best record with least resistance to relative movement. The transparent target 26 will be used for normal applications. The opague metal target 26' with or without the observation window 50, will be used where the clear target 26, with its coating, is not adequate for the environment or where a more pecise record is required. The latter scribed record can be more precise because it may be finer.

FIGS. 13A, 13B, 13C, show a species of target 66 which replaces target 26. FIG. 13A shows a plan view. Contact lines 71 are embedded in its lower surface each of which is connected to a connector 58 which is attached to the upper side of target 66. Parallel electric members 62 lie directly above electric contact lines 71 to which they are electrically connected through connection 62' shown in FIGS. 13B and 13C. FIG. 13B shows an end view of FIG. 13A showing target 66 with electric lines 71, mating strips 62, and connectors 58. FIG. 13C shows two fragmentary enlargments of FIG. 13B. The upper enlargement shows slight insulated ridge 74 on each side of electric contact strips 71. The lower view of FIG. 13C shows an alternate species of the view immediately above. Here the electric contact strip is slightly indented at 76 below the surface of target 66. Point 24' and electric strips 71 are both made of materials suitable for making repeated electrical connections whenever arms 23 or 56 move to cause point 24' to contact line 71. Target 66 is made of non-conducting material such as glass or plastic. Contact lines 71 are embedded in its lower surface so that they do not interfere with movement of point 24' across their surfaces except that ridge 74 or the depressed contact lines 71 are provided to cause point 24' to move quickly into full contact with contact line 71. One or more electrical connections 62' are made between the contact lines 71 and a parallel electrical member 62 on the upper side of target 66. The contact lines 71 are carefully spaced on target 66 so that the distance between the lines represents a definite amount of strain or movement in the workpiece. The parallel electrical members 62 are insulated on their upper side except where individual members 62 are equipped with a connector fitting 58.

This species of the invention provides a switching system which mechanically closes switching circuits for one or more strain or motion levels. All that the operator needs to do is to make electrical connections with the connector fitting(s) 58 that he chooses to use with one wire and connect the other wire of each set with neutral electrical connector 75, FIG. 5 and 10, which has an FIGS. circuit to point 24'.

FIG. 7 is a combination of section 7—7 of FIGS. 3 and 6. It shows the position of lever arm 19 and marking indicator arm 23 in base plate assembly shown in FIG. 5.

The recorder may greatly amplify the movements being recorded. When the strains are high the gage length of the recorder must be proportionately reduced to prevent point 24 or 24' of marker arm 23 or 56 from striking the sides 14 or side rail 28 of the large base plate 12 or 35. To provide for short gage length attachments, sides 14 of base plate 12 are perforated to bend down tabs 99 at fixed gage length intervals on opposite sides as indicated in FIGS. 6, 7, and 7A. (The perforations are similar, upper and sides of tabs 99, to knock out plugs in electrical fixtures.) One set of such bent down tabs is illustrated at 99 in FIGS. 6 and 7. Side rails 28 covers the removed area of base plate side 14. The hole 77 in the tabs 99 is used to bend them down and as mounting holes. Often times, recording instruments of the type described in this invention, are mounted on vibrating structures. Inorder to minimize the unwanted effects of vibrations, the invention includes balancing weight 68 attached to plate 67 which is fixed to the upper side of marking arm 23, as illustrated in FIGS. 8 and 9. The size, mass, and final location of these weights and their support will be determined by balance calculations and by vibration test of the recorder in the XYZ planes, but generally speaking, weight 68, FIGS. 8 and 9, will dynamically balance the entire system. This system will be used for balancing all species shown in this invention even though the locations for the weights may be considerably different.

Referring to FIG. 8, weight support 67 and balance weight 68 are spaced above mounting area 20 and its spacer block 90 to permit freedom of motion of arm 19 and marking indicator arm 23. Weight support plate 67 is spot welded to marking indicator arm 23 as indicated at 46.

Most materials expand when heated and contract when cooled. Each material has its own characteristics of thermal expansion. The coefficient of expansion of aluminum is approximately twice that for steel. In recording strains that occur over a protracted period of time it is important that the recording instrument not move because of temperature changes. The recorder proposed herein may be provided with temperature compensation to eliminate any error due to temperature changes. FIGS. 22 and 23 show the added temperature compensation plates. Plates 70 and 98, having the same thermal expansion characteristics as that of the workpiece, are attached between the recorder base plates 15 and 12, FIG. 3, or spacer block 78 and base plate 35, FIGS. 16 and 17, and the workpiece. A small piece of the temperature compensated material 70 is attached to the underside of small base plate 15 at spot welds 64. One end of another piece of compensating base plate 98, FIG. 22, is attached to the underside of the large base plate 12 at spot welds 72 directly opposite the spot weld attachments 64 to the small base plate 15. The lower side of each of the two auxiliary base plates 70 and 98 are attached to the structure being tested. The proper gage length is the measured distance between attachments of small base plate 70 and large base plate 98 to workpiece. An additional sliding attachment between slot 94-94' and tongue 97 and under lip 80 is shown in FIGS. 22 and 23. A tongue 97 fits in slot 94-94'. Slot 94-94' fits under lip 80. This attachment permits longitudinal movement between the compensating material and the large base plate but the plates are fixed to each other to prevent lateral or vertical movement of this fitting. A similar arrangement is provided for base plate 35, FIG. 10, which has its slot 79 to one side relative to that for base plate 12. Also, the location of spot welds 64 and 72 are indicated with open circles on FIGS. 3 & 10. These spot welds will only be used when the recorder-indicator is temperature compensated. If plate 70 is attached to spacer 78 at the same longitudinal position that it is attached to the workpiece; then the thermal expansion characteristics of plate 70 is unimportant FIGS. 17 and 22.

The large temperature compensating base plate 98, FIG. 22 is wider than the recorder so as to permit its attachment to the structure upon which it is mounted at any distance between the small base plate attachment and the other end of the recorder. Holes 100 on opposite side of plate 98 are spaced at specific longitudinal distances from the attachment location of small temperature compensation base plate 70 to provide specific gage lengths. If adhesive bonding is used then the extended sides may be removed and the adhesive applied to the under surface of large base plate 98 and small base plate 70 of FIG. 22. Temperature compensating base plate 98 may be extended to any length to provide a desired gage length. Also, it may be stiffened by forming it into a channel. This accomplished by bending up the sides along the dashed lines of FIG. 22. In this case, tabs similar to 99 of FIG. 6, are left flat at specific locations for attachment of the recorder to the structure.

Thus, a temprature compensated recorder does not cause movement between the two auxiliary base plates due to temperature changes so long as the auxiliary plates remain at the same temperature as that of the structure to which they are attached. This is so because base plates 12 and 15 or 35 and 51 are attached to the associated temperature compensating material at the same location longitudinally. An overlay blanket of insulating material (not shown) may be used to assure constant temperature between the auxiliary base plates and the associated structure. The recorder is self temperature compensating when its parts are made of materials having the same coefficient of thermal expansion as that of the workpiece.

FIGS. 26 and 27 show a special slide holder for target 26 of FIG. 6. The outside dimensions of the slide holder mate the dimension of a standard slide. Each side of slide 81 is faced with thin pliable metal sheets 89.

On one side of slide 81 the face sheet 89 extends a small distance beyond the cut out area 91 for receiving target 26. On the other side of slide 81 the face sheet 89 is folded back as shown at 92 near cut out area 91 on three adjacent sides. On the other side the face sheet 89 extends a small distance beyond the opening for target 26. Target 26 is inserted into the aperture 91 of slide 81 on the side having face sheets 89 folded back as at 92. The target 26 enters between the two parallel pieces of face sheets at 96. Thereafter face sheet 89 on each side are folded over the target 26 and flattened followed by folding the remaining folded section of face sheet 89 giving the appearance shown in FIG. 26.

The twist pivot is satisfactory for a single stage of amplification, such as contemplated when arm 17-19 of FIG. 1 is eliminated and twist pivot 22 and twist pivot 11 become the same member. In this case, the sliding targets 26, 26' or 66 is placed at the other end of base plate 12. For higher mechanical ratios greater loads are required to actuate the indicator-recorder. Twist pivots may create too much deflection for the higher mechanical ratios. This is most critical at the first stage of amplification.

FIG. 10 through 20 illustrate the use of wheel pivots for the first stage of amplification and either twist pivots or strap pivots for the second stage of amplification. Wheel pivots may be used either singularly or in pairs. For a wheel pivot of a given size the allowable deflection is doubled when two such pivots are joined together.

Starting with FIG. 10 all of the wheel pivots have spokes 34 with cut out areas 87 on both sides. Cut outs 88 removes material between the cut out areas 87 on each side of each spoke 34. The strain in the spokes 34 may be limited by reducing the width of cut out areas 87 or 88. When hub 33 and spokes 34 are rotated until they contact the adjacent parts (beyond the cut out area) the hub rotation is retarded. When such contact occurs on opposite sides of the wheel pivot assembly the rotational movement is stopped.

This invention intends to make such movement limitation available for the wheel pivots to limit the strain in the spokes 34. When two wheel hubs 33 are spot welded together they form a thin pivot which permits small valves of pivotal deflection between the joined plates. The spokes 34 are made very narrow and they deflect in an "S" shape. One of the hubs will be rotationally deflected in a right hand direction and the mating hub will be rotationally deflected in a left hand direction. The first wheel pivot 29 of FIG. 10 will be attached to wheel pivot 30 of FIG. 12 with spot welds 106 at hubs 33. Likewise, wheel pivot 31 of FIG. 16 will be attached to the underside of wheel pivot 32 on plate 57, at hubs 33 with spot welds 106. FIG. 15, plate 57 is attached to lever arm 40 at spot welds 101, FIG. 14 and 15. The combined wheel pivot 29–30 is offset (83) from the combined wheel pivots 31–32 in the plane of the plan view of FIG. 10,14,15, and 16, but they lie close together (84) in the vertical plane. This is illustrated in FIG. 21.

A small out-of-plane moment is created when wheel pivots are made by joining two hubs. (This out-of-plane moments can be eliminated by straddle mounting one pivot member on each side of another pivot member of twice the thickness. (See FIG. 29)

The wheel pivot offset 84 of FIG. 21 illustrates the value of the out of plane moment relative to the in-plane moment illustrated at the wheel pivot offset 83. Because the lever plates are very thin they will tend to deflect out-of-plane from the effects of the moment created by the offset 84. To prevent out-of-plane deflection of members 40,51, and 57, the invention plans to make side rails 28 into a channel 102 (FIG. 21) in the region of wheel pivots 29–30 and 31–32. Channel 102 resists any tendency of members 40,51, or 57 to deflect away from their flat form and thereby stabilizes the first stage pivots.

FIG. 10 to 17, illustrated a species having second stage twist pivots 38 and 39 where the outboard twist pivot 38 is attached to the base plate 35.

An alternate arrangement of the second stage pivots 38' and 39' is shown in fragmentary FIG. 18. Pivots 21 and 22 of FIG. 3 and 38 and 39 of FIG. 14 are reversed In position relative to pivots 38' and 39' of FIG. 18. Mounting area 20 of FIG. 3 becomes fixture 36' in FIG. 18. In other respects, the species shown in FIG. 18 is formed in a manner similar to that described above for FIG. 3 and 14. The species shown in FIG. 18 has the advantage that the marking indicator arm 23 tends to balance the weight of the attached lever 19, pivot 22, and associated attachments, illustrated in FIG. 3 or arm 40' associated twist pivot 39' and butt end of marker arm 56' illustrated in FIG. 18. Another advantage arises from the fact that the movement of twist pivot 39' about wheel pivot 30 and twist pivot 38' are both from the same side of twist pivot 39'. This reduces the amount of shear movement noted at dimension 53 of FIG. 4 that must be accommodated by bending in pivots 38' and 39'. This alternate arrangement changes the location and reduces the required balancing weights. On the contrary, this species tends to be more cluttered due to the necessity of placing fixture 36' between pivot 39' and pivot 30. An alternate, not illustrated, is to locally raise the end of arm 40' above 36' for clearance.

FIG. 10 shows the base plate 35, formed sides 14, with lips 37, wheel pivot 29, and spot welded attached fixture 36 which rests on spacer 105 and carries twist pivot 38, a part of pivot fitting 43. Balance weight 45 is attached to pivot fitting 43 by a screw 45'. Circles 64 and 72 indicate locations of spot welds in base plate 35 and 51 when the recorder-indicator is temperature compensated.

FIG. 11 shows a section 11—11 of FIG. 10, where base plate 35 carries sides 14 and lips 37. Spacer block 105 lifts the attachment of fixture 36 above large base plate 35 sufficient to provide clearance between twist pivot 38 and top of base plate 35. Spot welds may be used to join fixture 36, spacer 105, and base plate 35, for example.

FIG. 12 shows a flat pattern of lever arm 40 and point 24 extending underneath marker arm 56.

In FIG. 14 marker arm 56 has been rotated to the right 180° about twist pivot 39. Pivot plate 57 is partially shown where it is spot welded to lever 40 as indicated at 101. The butt end of marking arm 56 is offset down the thickness of pivot fitting 43 as indicated by dashed lines at 41. This places arm 56 and fitting 43 on the same level.

Terminal drive base plate 51, FIG. 16, carries attachment area 42. Spacer block 78 is spot welded underneath area 42 but is reduced in width providing a sliding fit between the ears of base plate 35 of FIG. 10.

FIG. 17 shows a side elevation combining the base plate 35 of FIG. 10 and the pivots and levers described above. The near side 14, lip 37, and electrical connector 75 are removed for clarity. This figure shows the relationship between the levers, pivots, spacer, target, marker, cover, and case comprised of base plates 35, sides 14, and lip 37. Particularly it shows the relationship of marking arm 56 and levers 40 and 57 as they relate to terminal plate 51 and spacer 78. Marker arm 56 is shown with its twist pivots 38 and 39. The upper side of bowed down cover plate 25 is indicated by a dashed line. Target 26 carries an attached dust seal at 49 to exclude the entrance of dirt and dust at the opening between target 26 and cover 25. End plates 107 and 107' are fixed rigid to sides 14 of base plate 35. They have a dust exclusion member 49 which are attached to end plates 107 and 107' of FIG. 6 and 17.

It may be necessary to stiffen marking arm 56 or lever 40. This may be accomplished by bending a flange 56A, 56B or 40A as illustrated in FIG. 18 and 20 respectively.

FIG. 20 shows a further refinement of the invention. In this case, the relative location of the second stage pivots is substantially the same as shown in FIG. 18.

A flat pivot assembly 57 replaces twist pivot 39' and a single flat pivot member 93 replaces twist pivot 38' of FIG. 18. The single flat pivot member 93 is a plate with two separated areas bent 90°. One of the areas fixture 109 is spot welded to the top of marker arm 56'. The other area is fixture 110 which is spot welded to base plate 35. The 90° bend to form fixture 109 is offset above the 90° bend to form fixture 110. This offset lifts marker arm 56' to clear base plate 35 and lever arm 40'.

Fixture 111 is spot welded to arm 40' and fixture 112 is spot welded to marking arm 56'. Fixture 111 which is spot welded to the upper face of the end of lever 40' is on the same level as fixture 112 which is spot welded to the upper face of arm 56' to provide for movement of lever 40' and indicator arm 56' relative to base plate 35 as shown in FIG. 20. Each of the fixtures 111 and 112 are attached to one end of each of the pivot members. Member 82 is a bent up part of fixture 112. It extends parallel to lever plate 40'. Dual members 77A and 77B are a bent up part of plate 111. They straddle member 82 at right angles. The other ends of members 82 and 77A and 77B are attached to bent up members of fitting 111 and 112 respectively by spot welds. Members 59 and 60 illustrate added members to limit the radius of bend in strap members 82, 77A, 77B, and 93.

While the description above states the use of spot welding for joining parts, it should be understood that the parts may be joined by any suitable means including adhesives, solder, mechanical deformations, etc. Also, members may be supported and strain limited by any suitable means such as the use of added bent over tabs and radius of bend supports, illustrated at 59 and 60 of FIG. 20.

The advantage of the present instrument is that the strains being recorded can be seen while they are being recorded; the target can be moved manually or automatically to new locations; and the recorded data can be directly observed or be enlarged for easier evaluation. Also, the invention contemplates the use of limit switches to electrically count strain or motion events to various levels or to provide an alarm system.

Because the pivots and arms are without lost motion or hysteresis, reliable results are attained. Because the wheel pivots are very thin they can be placed very close together. This permits amplifying the motion greatly in a very compact instrument.

For purposes of exemplification particular embodiments of the invention have been shown and described according to the best present understanding thereof. However, it will be apparent that changes and modifications in the arrangement and construction of the parts thereof may be resorted to without departing from the spirit and scope of the invention.

We claim:

1. An instrument comprising a first and second support means, marking means actuated by movement between said first and second support means, a target for recording the movement between said first and second support means, said target being mounted on said second support means, said marking point engaging said target and attached to a lever comprising a thin flat sheet of material attached to said second support means through a flat flex pivot, said flex pivot formed in said flat sheet by removing material to form a hub and spokes.

2. A claim according to 1 including
and said removed material limited to provide stops for the angular motion of said flex pivot.

3. An improvement according to claim 1 having,
said second support means including a third plate disposed below said second support means;
said third plate having the same coefficient of thermal expansion as the workpiece to which it is secured, said second support means and said third plate fixed together;
said first support means attached to said workpiece at substantially the same longitudinal distance as said attachment of said first support means to said workpiece.

4. An improvement according to claim 1 including, said target having scale lines parallel to said movement for evaluating said recording.

5. An improvement according to claim 1 including, said instrument is covered to exclude dust and dirt.

6. An instrument comprising first and second support means, a target for recording the movement between said first and second support means, said target being slideably mounted on said second support means, a lever system including a marking means activated by motion between said first and second support means, said lever system having flex pivots, said marking means engaging said target, said lever system comprising a first and second lever; said first lever having a first and second branch for pivots; said first branch is pivoted to said second support means, and said second branch is pivoted to said first support means.

7. An improvement according to claim 6 including,
said second support means including a plurality of mounting tabs to secure said second support means to a workpiece from which a record of movement is made.

8. An improvement according to claim 6 including,
said lever system is formed from two flat pieces of material.

9. An improvement according to claim 6 using,
manual means for moving said target in said slide mount.

10. An improvement according to claim 6 having,
remote means for moving said target in said slideable mount.

11. An improvement according to claim 6 in which said lever system is dynamically balanced.

12. A claim according to claim 6 in which
the end of said first lever opposite to the first and second branches is joined to said second lever through secondary first and second pivots.

13. An improvement according to claim 12 where,
said second secondary pivot pivotally fixes said second lever to said first lever; said second secondary pivot is formed by flexing a first and second strap member flatwise; said first and second strap members oriented to form a substantial angle between them.

14. An improvement according to claim 12 where,
said first secondary pivot is attached to said first lever through a strap member which permits deflection between said first and second levers in a direction parallel to the longitudinal axis of the indicator-recorder but is rigid in a lateral direction.

15. An improvement according to claim 14 in which,
said flex pivots having strap members
said strap members fitted with supports to limit the radius of bending curvature of the strap members.

16. An instrument for recording strains or movements comprising a first and second support means; a target for recording the movement between said first and second support means; said target being mounted on said second support means; a lever systems including a marking point activated by motion between said first and second support means; said marking point engaging said target; said lever system comprising a first and second pivot assembly; said first pivot assembly attached to said second support means and comprising stacked flat plates retained in position between said second support means and parallel bulkhead which is fixed to said second support means.

* * * * *